No. 688,265. Patented Dec. 3, 1901.
W. D. RICHTER.
BRACKET.
(Application filed Apr. 3, 1901.)
(No Model.) 2 Sheets—Sheet 1.
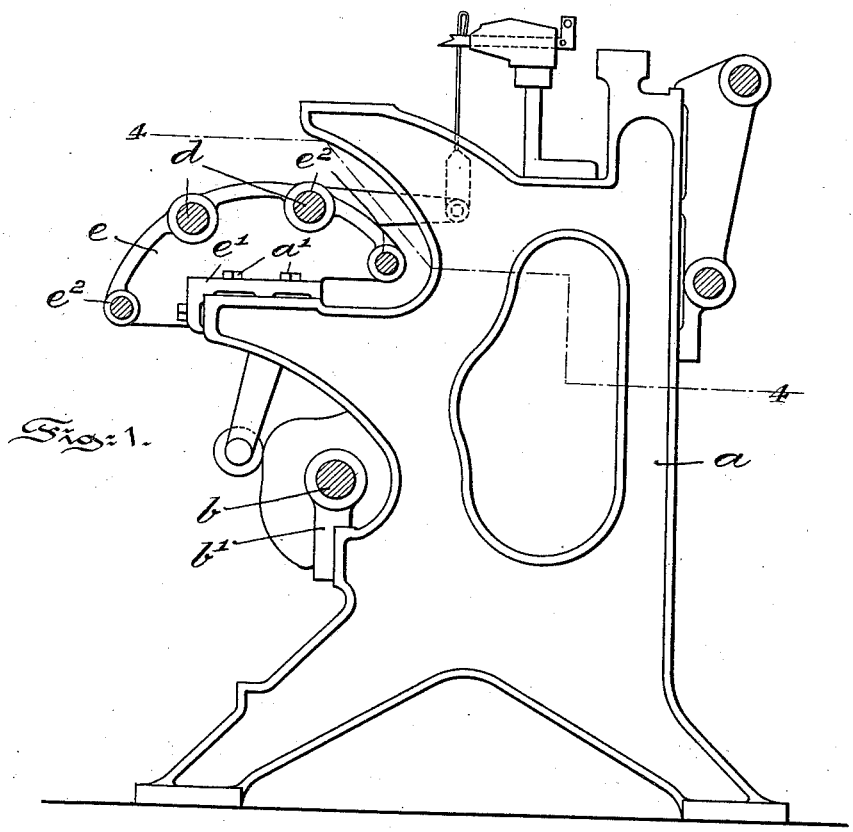
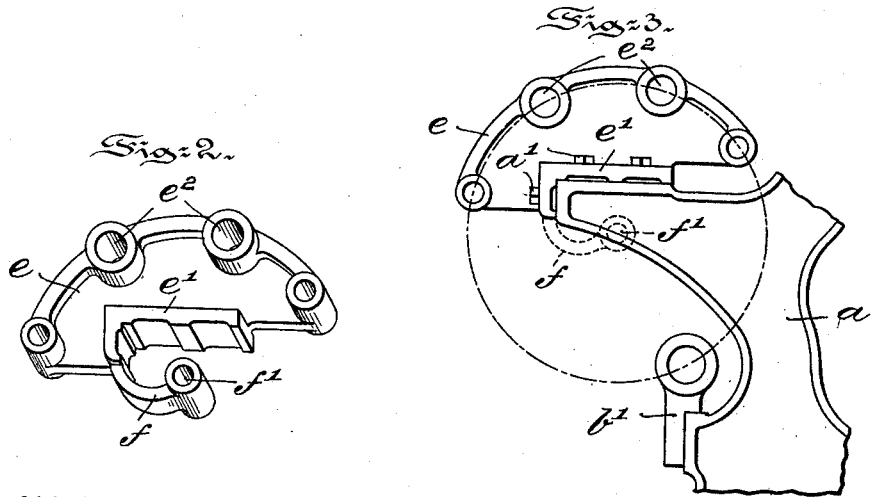

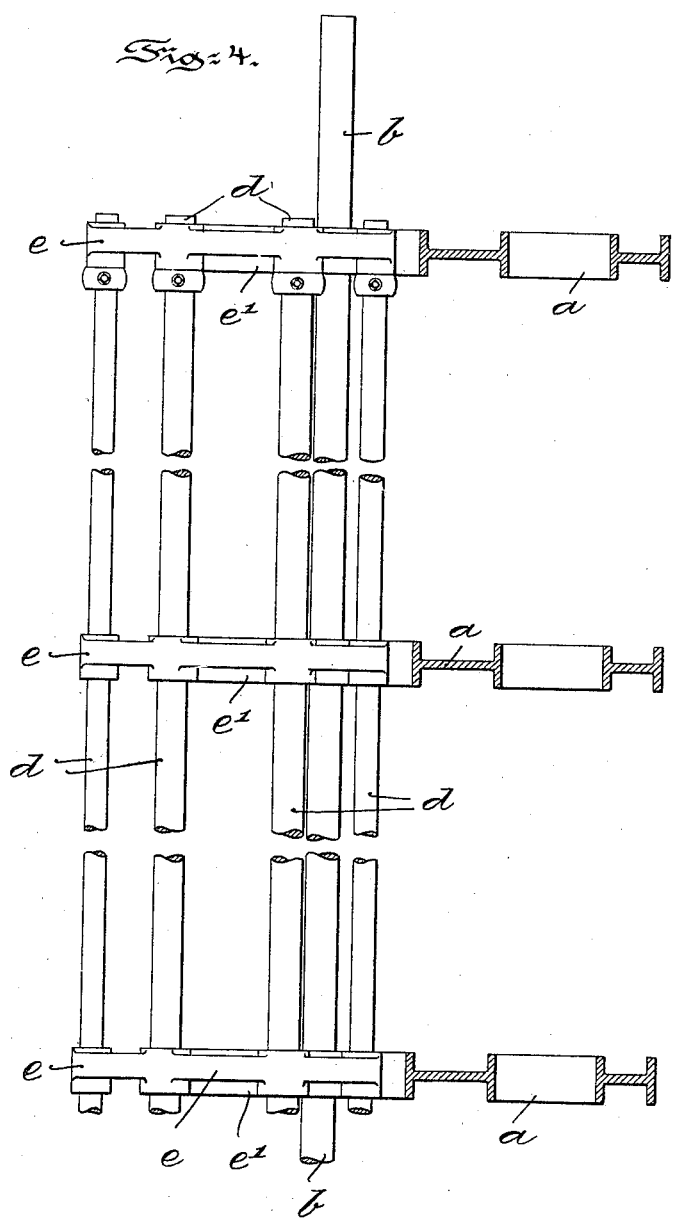

UNITED STATES PATENT OFFICE.

WOLFGANG D. RICHTER, OF PHILADELPHIA, PENNSYLVANIA, ASSIGNOR TO DOMESTIC MACHINERY WORKS, OF PHILADELPHIA, PENNSYLVANIA, A PARTNERSHIP ASSOCIATION OF PENNSYLVANIA.

BRACKET.

SPECIFICATION forming part of Letters Patent No. 688,265, dated December 3, 1901.

Application filed April 3, 1901. Serial No. 54,124. (No model.)

*To all whom it may concern:*

Be it known that I, WOLFGANG D. RICHTER, a subject of the Emperor of Germany, residing at the city of Philadelphia, in the county of Philadelphia and State of Pennsylvania, have invented certain new and useful Improvements in Brackets, of which the following is a specification.

My invention has relation to a bracket for supporting the operating-shafts of hosiery or like machines; and in such connection it relates to the construction and arrangement of the bracket.

In machines of the type to which my invention is especially applicable the shafts operating various parts of the machine are of great length and require not only end but intermediate bearings or supports to a number equaling ten and often exceeding that number. When a number of shafts are required, each shaft has heretofore been provided with a separate series of supports and each support in the series was separately adjusted. The time and skill necessary to adjust this great number of supports or bearings materially increased the initial cost of the machine, and a slight variation due to wear and tear in one bearing alone necessitated an enormous amount of work before all the bearings could be adjusted or repaired and brought to the required relationship with each other.

The principal object of my present invention is to provide a bracket whereby all the operating-shafts may have their bearing in such bracket or support and the series of brackets or supports may all be initially drilled or furnished with openings for the reception of the shafts, so that when each bracket is secured to the frame of the machine all the openings for the several shafts will be in alinement after each bracket is properly adjusted with respect to the frame of the machine and to the other brackets, and the openings for the operating-shafts will form a guide for adjusting the bearings for the main shaft of the machine, and, second, to provide a bracket of segmental shape adapted to be secured at its base to the frame of the machine and provided in its body at or near its perimeter with openings for the operating-shafts, the centers of the openings being preferably arranged in an arc of a circle drawn from a common center and passing through the center of the main shaft.

The nature and scope of my invention will be more fully understood from the following description, taken in connection with the accompanying drawings, forming part hereof, in which—

Figure 1 is an end elevational view of a hosiery-machine with the bracket for supporting the operating-shafts arranged in operative position and embodying main features of my invention. Fig. 2 is a perspective view of the bracket prior to its attachment to the machine, the bracket having a tailpiece which assists in the carrying into effect of my invention. Fig. 3 is a detail view illustrating the bracket and also the steps in the method of supporting the operating-shafts; and Fig. 4 is a top or plan view of the brackets and of the operating-shafts of a hosiery-machine supported therein, said machine being sectioned on the line 4 4 of Fig. 1.

Referring to the drawings, $a$ represents the frame of the machine, and $b$ the main shaft. This shaft $b$ is supported in brackets $b'$, which are adjustable on the frame $a$ of the machine in the usual well-known way. The operating-shafts $d$ have their bearings in a plurality of brackets $e$, each bracket being common to all the shafts $d$ and of substantially segmental shape. The base of each bracket $e$ has an angular extension $e'$, by means of which the bracket may be secured in proper position upon the frame $a$ by bolts $a'$ or otherwise, as required. The curved periphery of the bracket $e$ is provided with a series of openings $e^2$, all drilled so that the centers of all the openings $e^2$ lie preferably in the arc of a circle, which if continued, as illustrated in Fig. 3, would pass through the center of the main or driving shaft $b$. To properly lay out these openings, the bracket $e$ is preferably provided with a tailpiece $f$, (see Figs. 2 and 3,) at the end of which an opening $f'$ is drilled, the center of which opening $f'$ represents the center from which the arc passing through the center of each of the openings $e^2$ and the center of the shaft $b$ is to be drawn. The bracket $e$, thus provided with its tailpiece $f$, is pivotally secured by means of the opening $f'$ in the bed of the drilling-machine and the segmental bracket revolved about its pivot to present to the tool the required portions of the periphery of the bracket $e$ in which the openings $e^2$ are to be drilled. When the openings $e^2$ are so drilled, the tailpiece $f$ is preferably cut off and the bracket $e$ secured to the frame $a$ of the machine, as illustrated in Fig. 1. It is obvious that hundreds of absolutely symmetrical brackets $e$ may be formed in this manner and that their openings $e^2$, the centers of which are in an arc drawn from common centers $f'$, will all register after the brackets are drilled. When, therefore, the shafts $d$ are to be supported, the workman is obliged simply to properly secure and adjust each bracket $e$ on the framework of the machine, and if thus secured and adjusted the brackets $e$ will receive and support all the shafts $d$ in absolutely true relationship to each other as well as to the frame $a$ of the machine. After the brackets $e$ have been adjusted and the shafts $d$ properly adjusted the driving-shaft $b$, with its bearings $b'$, is then adjusted so that the center of the shaft $b$ will lie in the arc traversing the centers of the shafts $d$, as clearly illustrated in Fig. 3.

Having thus described the nature and objects of my invention, what I claim as new, and desire to secure by Letters Patent, is—

The combination in a machine of the character described, of a series of operating-shafts, a plurality of brackets constituting the bearings for all the operating-shafts, and each bracket being symmetrical with the other brackets and each comprising a body portion of substantially segmental shape, and an angular base portion, said body portion provided at or near its perimeter with a series of openings corresponding in number with the series of operating-shafts and adapted to receive said shafts to constitute a fixed bearing therefor, the centers of said openings lying in an arc of a circle drawn from a center below the angular base portion, and means for adjustably securing the base portion of each bracket to the frame of the machine.

In testimony whereof I have hereunto set my signature in the presence of two subscribing witnesses.

WOLFGANG D. RICHTER.

Witnesses:
J. WALTER DOUGLASS,
THOMAS M. SMITH.